United States Patent [19]

Granbery

[11] Patent Number: 5,207,441
[45] Date of Patent: May 4, 1993

[54] SAILBOARD TRAILER APPARATUS

[76] Inventor: Carleton A. Granbery, Creampot Rd., Hartland Four Corners, Vt. 05049

[21] Appl. No.: 759,356

[22] Filed: Sep. 13, 1991

[51] Int. Cl.⁵ .................................................. B62B 1/10
[52] U.S. Cl. ................................ 280/204; 280/47.331
[58] Field of Search ................ 280/47.331, 414.1, 204

[56] References Cited

U.S. PATENT DOCUMENTS

| | | |
|---|---|---|
| 3,347,559 | 10/1967 | Robinson . |
| 3,877,723 | 4/1975 | Fahey et al. . |
| 4,544,172 | 10/1985 | Poulouin ........................ 280/47.331 |
| 4,602,802 | 7/1986 | Morgan ........................... 280/47.331 |
| 4,614,352 | 9/1986 | Cervantes . |
| 4,725,067 | 2/1988 | Lundy . |
| 4,928,985 | 5/1990 | Nowlin ................................ 280/204 |
| 5,114,165 | 5/1992 | Vogel ............................... 280/47.331 |

FOREIGN PATENT DOCUMENTS

| | | |
|---|---|---|
| 3044595 | 6/1982 | Fed. Rep. of Germany ......................... 280/47.331 |
| 3501904 | 9/1986 | Fed. Rep. of Germany ......................... 280/47.331 |

*Primary Examiner*—Russell D. Stormer
*Assistant Examiner*—Joseph D. Pape
*Attorney, Agent, or Firm*—Henderson & Sturm

[57] ABSTRACT

A trailer apparatus (10) for bicycles (200) to transport the hull (100) and mast (101) of a sailboard; wherein, the hull (100) and mast (101) form operative parts of the trailer apparatus (10); and, operatively connect the primary (11) and secondary (12) support units of the trailer apparatus to the bicycle (200) via a coupling unit (13).

17 Claims, 3 Drawing Sheets

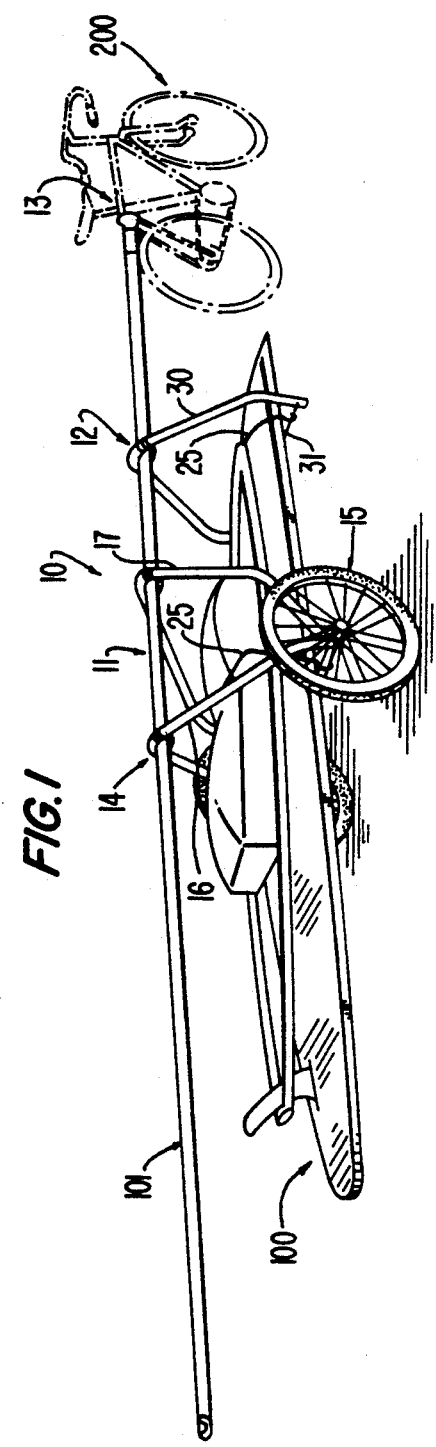
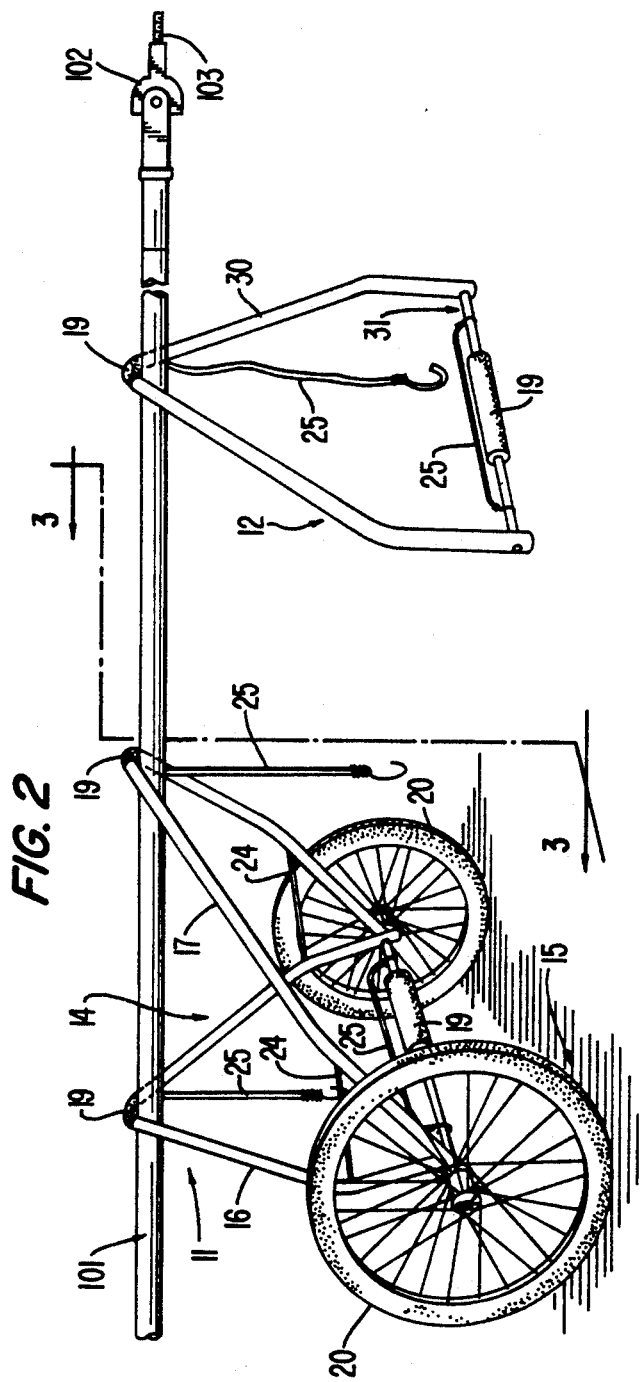

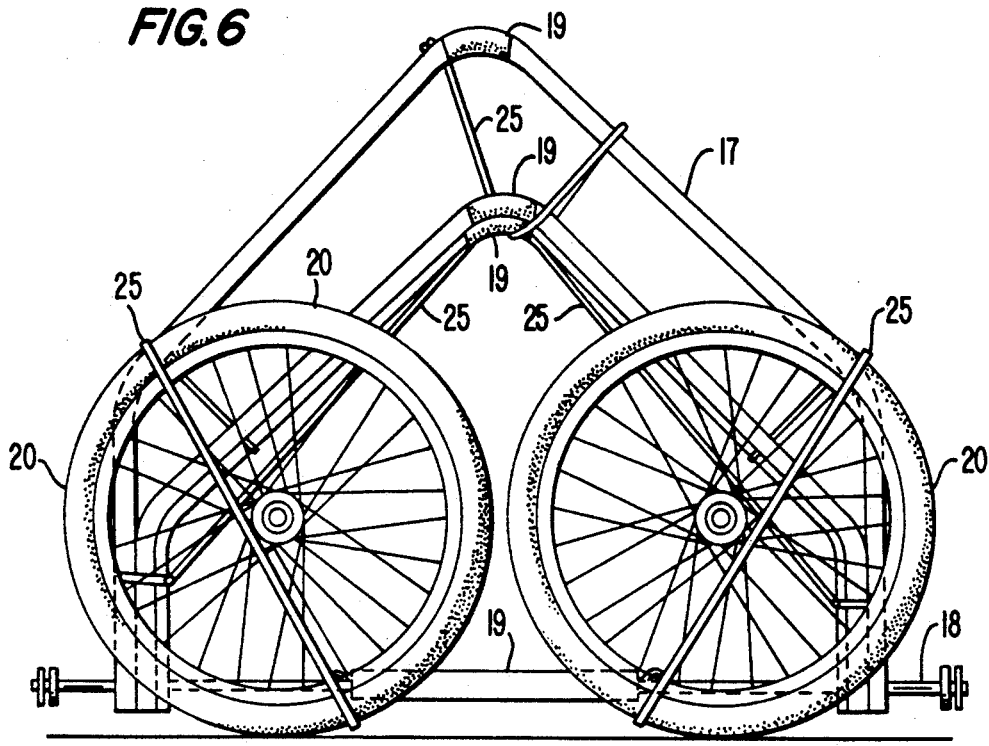
FIG. 6
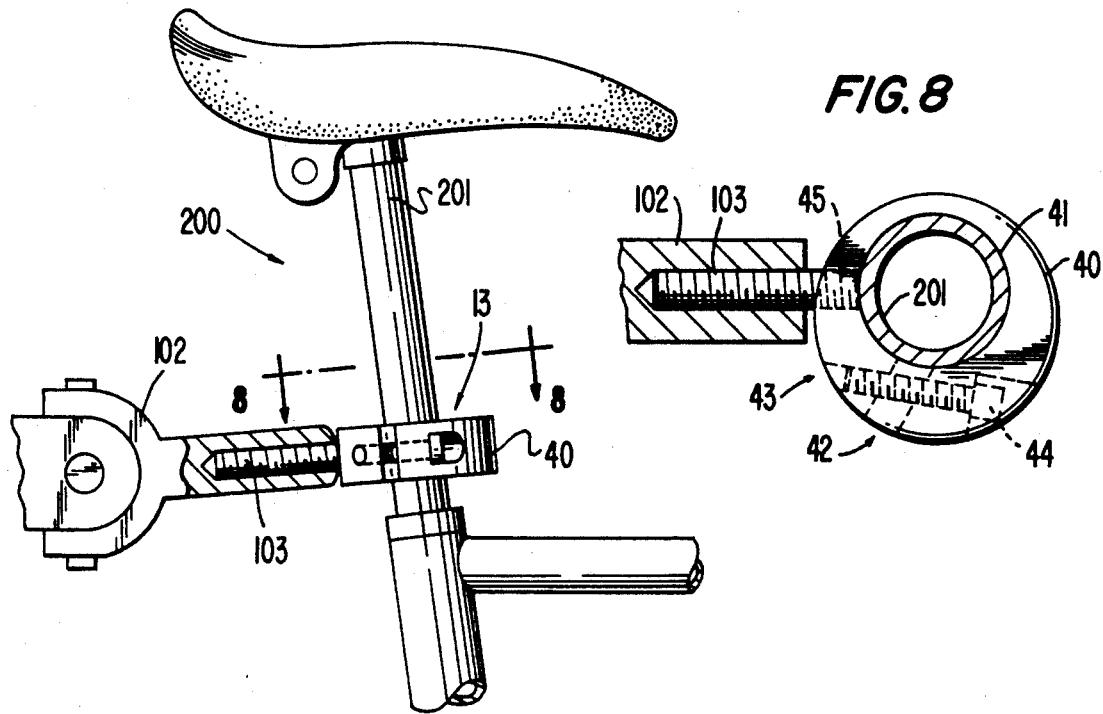
FIG. 7
FIG. 8

SAILBOARD TRAILER APPARATUS

TECHNICAL FIELD

The present invention relates to the field of trailer apparatus in general, and in particular to a specialized trailering apparatus that is specifically designed to transport a sailboard.

BACKGROUND ART

This invention was the subject matter of Document Disclosure Program Registration No. 253,537 which was filed in the United States Patent and Trademark Office on May 21, 1990.

As can be seen by reference to the following U.S. Pat. Nos. 3,347,559; 4,725,067; 4,614,352; and 3,877,723; the prior art shows a variety of different trailer arrangements for bicycles.

While all of the aforementioned prior art constructions are more than adequate for the basic purpose and function for which they have been specifically designed, these patented devices were neither designed nor intended to be used in conjunction with a sailboard, no less having the sailboard mast function as the primary component of the trailer tongue.

Furthermore, the rising popularity of windsurfing-/boardsailing and the difficulty of transporting and finding parking close to the water to off load the sailboard, has caused a number of people to look to a bicycle as an attractive alternative for transporting a sailboard.

As a consequence of the foregoing situation, there has existed a longstanding need for a bicycle attached trailer apparatus that is compact, lightweight, and which will simply and efficiently provide a convenient means for transporting a sailboard to a point of use; and, the provision of such a construction is a stated objective of the present invention.

DISCLOSURE OF THE INVENTION

Briefly stated, the sailboard trailer apparatus that forms the basis of the present invention comprises a primary wheeled support unit; a secondary support unit, and a coupling unit which cooperate with one another and the hull and mast of the sailboard to form the trailer apparatus.

As will be explained in greater detail further on in the specification, one of the more unique aspects of this invention revolves around the fact that the board hull and mast form integral components of the trailer in a symbiotic relationship.

In essence the lower portions of the primary support unit and the secondary support unit are operatively connected together on one end to the sailboard hull; while the upper portions of the primary support unit are operatively connected together on their other end to the sailboard mast.

Furthermore the sailboard mast is operatively connected on its inboard end to the bicycle via the coupling unit; wherein the upper end of the primary support unit maintains the outboard end of the mast at an elevated location while the secondary support unit is suspended from the intermediate portion of the mast.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the trailer apparatus attached to a bicycle;

FIG. 2 is an isolated perspective view of the primary and secondary support units and the sailboard mast;

FIG. 6 is a front plan view of the primary and secondary support units in their collapsed disposition;

FIG. 7 is an isolated detail view of the operative connection between the mast, the coupling unit, and the bicycle; and, FIG. 8 is a sectional view taken through line 8—8 of FIG. 7.

BEST MODE FOR CARRYING OUT THE INVENTION

Figure 3:
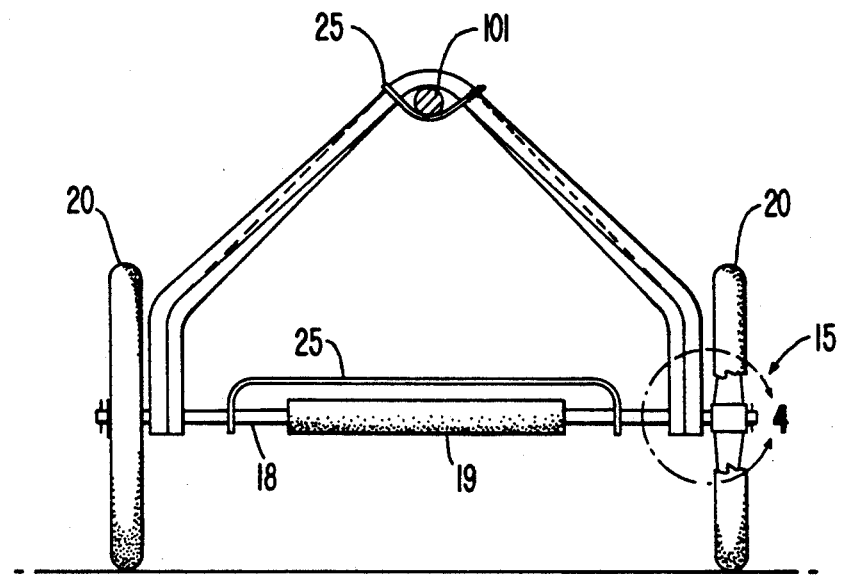
FIG. 3 is a sectional view taken through line 3—3 of FIG. 2.

As can be seen by reference to the drawings, and in particular to FIG. 1, the sailboard trailer apparatus that forms the basis of the present invention is designated generally by the reference numeral (10). The apparatus (10) comprises in general a primary wheeled support unit (11); a secondary support unit (12); and, a coupling unit (13) which cooperate with the sailboard hull (100) and mast (101) to form the trailer apparatus (10) which is adapted to be operatively connected to the seat post (201) of a bicycle (200). These units will now be described in seriatim fashion.

Figure 4:
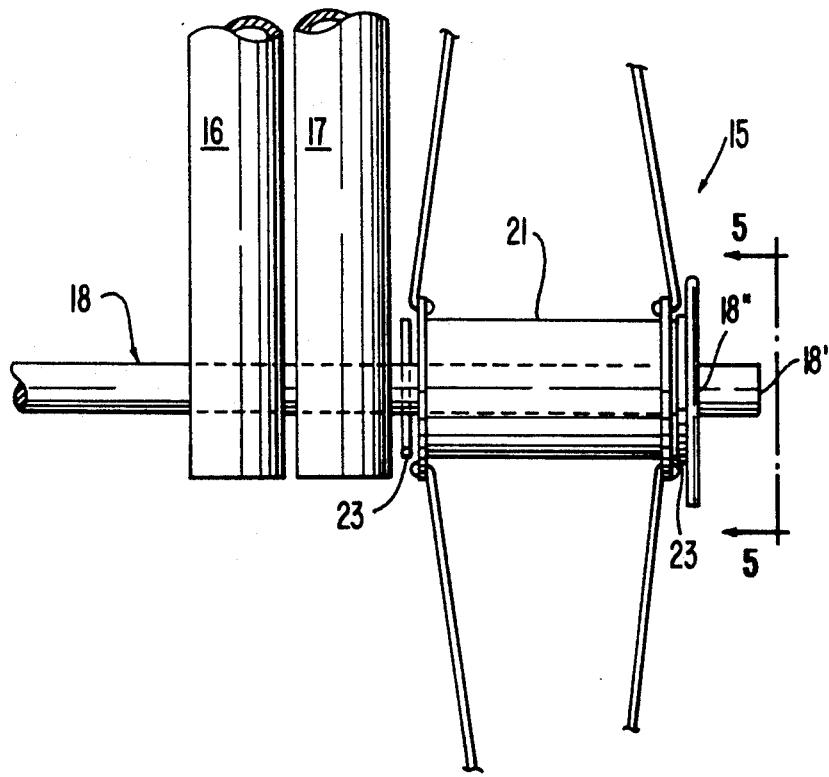
FIG. 4 is an isolated detail view of the wheel and framework assembly on the primary support unit.
Figure 5:
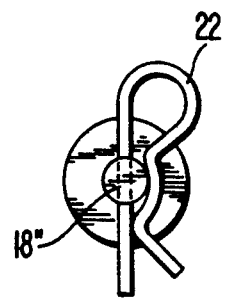
FIG. 5 is an isolated sectional view taken through line 5—5 of FIG. 4.

As shown in FIGS. 2, through 4, the wheeled support unit (11) comprises a framework assembly (14) mounted on a wheel assembly (15). The framework assembly comprises a first and second tubular framework member (16) and (17) each having a generally inverted V-shaped configuration; wherein the framework members (16) and (17) are operatively and pivotally connected relative to one another by a first cross-piece element (18) which extends across the open end of the V-shaped configuration.

In addition the apex of both of the framework members (16) and (17), and the intermediate portion of the cross-piece element (18) are all provided with cushion elements (19) whose purpose and function will be described in greater detail further on in the specification.

Still referring to FIGS. 2 through 4, it can be seen that both the inner (16) and outer (17) framework member are pivotally connected to the cross-piece element (18); wherein the cross-piece element (18) projects beyond the outer framework member (17) and serves as the axle for the wheel assembly (15).

The wheel assembly (15) comprises a wheel member (20) mounted on a hub (21) which is dimensioned to slide over the outboard ends (18') of the cross-piece element (18); wherein, the outboard ends (18') of the cross-piece element (18) are provided with apertures (18") which are dimensioned to receive a locking pin member (22) to prevent the hub (21) from sliding off the axle. In addition, the wheel assembly (15) may further be provided with a pair of enlarged friction washers (23) disposed on opposite sides of each hub (21) to prevent the lateral displacement of the hubs (21) relative to the axle.

As shown in FIG. 2 a brace member (24) is disposed between the inner (16) and outer (17) frame members, to maintain the frame members (16) and (17) at a desired angular orientation relative to one another as will be explained further on in the specification. In addition both of the inner (16) and (17) outer frame members are provided with tether elements (25) which are disposed proximate their apexes; and, the cross-piece element (18) is provided with another tether member (25) which is disposed proximate the lower end of frame member (16).

As can best be seen by reference to FIGS. 1 and 2, the secondary support unit (12) comprises a third tubular framework member (30) having a generally inverted V-shaped configuration and having a second cross-piece element (31) disposed across the open end of the V-shaped configuration. In addition the apex of the third framework member (30) is provided with a cushion element (19) and a tether member (25); and the cross-piece element (31) is also provided with a cushion element (19) and a tether member (25).

Turning now to FIGS. 1 through 3, it can be seen that the primary (11) and secondary (12) support units are operatively connected to one another on their upper ends by the sailboard mast (101); and, on their lower ends by the sailboard hull (100).

As shown in FIG. 1, the sailboard hull (100) rests on the first (18) and second (31) cross-piece elements on the primary (11) and secondary (12) support units; wherein, the hull (100) is releasably secured to the cross-piece elements (18) and (31) via the lower tether members (25) in a well recognized fashion.

Furthermore as shown in FIGS. 1 and 2, the sailboard mast (101) is releasably secured to the apexes of the first (16), second (17), and third (30) tubular framework members; wherein the secondary support unit (12) is literally suspended from the mast (101) in the operative mode of disposition of the apparatus (10).

As can best be seen by reference to FIGS. 1, 2, 7 and 8 the threaded end (103) of the conventional universal connector (102) at the base of the mast (101) is operatively connected to a bicycle (200) via the coupling unit (13). The coupling unit comprises in general a split collar member (40) having an enlarged axially offset aperture (41) which is dimensioned to slideably receive the seat post (201) of a bicycle (200). In addition the offset aperture (41) is in communication with the opening (42) in the split collar member (40) and a transverse threaded bore (43) is formed on opposite sides of the split opening (42); wherein, the transverse bore (43) is dimensioned to receive a threaded fastener (44) for controlling the size of the split opening (42) in a well recognized manner.

Furthermore the collar member (40) is provided with a threaded recess (45) which is dimensioned to threadingly engage the threaded end (103) of the mast universal connector (102) to form the operative engagement between the train apparatus (10) and the bicycle (200).

In the operative mode of disposition of the trailer apparatus (10) depicted in FIG. 1, the mast (101) is attached to the coupling unit (13) which is secured to the bicycle (200). At this point the secondary support unit (12) is slipped over the free end of the mast (101) and secured thereto by one of the tether members (25). Then the primary support unit (11) is likewise engaged with the mast (101) by wrapping the upper tether members (25) around both the mast (101) and the upper portions of the first (16) and second (17) tubular members.

Once the mast has been secured to the primary (11) and secondary (12) support units, the sailboard hull (100) is then laid across the first (18) and second (31) cross-piece elements; wherein, the lower tether members (25) are used to releasably secure the hull (100) to the primary (18) and secondary (31) cross-piece elements in a well recognized manner.

As can further be appreciated by reference to FIG. 6, when the apparatus (10) is not in use it can be broken down into a very compact size for storage purposes. To accomplish this objective all that is necessary is for the user to withdraw the locking pin (22) to remove the wheel assembly (15) from the primary support unit (11). Then the brace (24) is disconnected between the first (16) and second (17) tubular framework members so that they can be folded together; and lastly, the wheel assembly and the primary (11) and secondary (12) support units are joined together by the tethers (25) as depicted in FIG. 6.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A trailer apparatus for use with a bicycle to transport a sailboard including a hull and a mast having a coupling provided at the base of the mast; wherein, the trailer apparatus comprises a primary wheeled support unit having an upper portion provided with means for releasably securing the primary support unit to said mast;

a coupling unit including means for operatively attaching the base of said mast to said bicycle: and, a secondary support unit provided with means for releasably securing the secondary support unit to said mast; wherein, both said primary and secondary support units are provided with means for supporting said hull at spaced locations; wherein said means for releasably securing said primary and secondary support units to said mast comprise a plurality of tether members.

2. The trailer apparatus as in claim 1; wherein, said bicycle is provided with a bicycle seat post, and said means for operatively attaching the base of the mast to said bicycle comprising a collar member having an enlarged aperture dimensioned to receive said bicycle seat post.

3. The trailer apparatus as in claim 2; wherein, said collar member is provided with means for operatively engaging the base of said mast.

4. The trailer apparatus as in claim 1; wherein, said primary and secondary support units are provided with means for releasably securing said hull to the means for supporting the hull at spaced locations.

5. The trailer apparatus as in claim 4; wherein said means for releasably securing said hull comprises a plurality of tether members.

6. The trailer apparatus as in claim 2; wherein, said coupling on the base of the mast is provided with a threaded end; and, said collar member is provided with threaded means for engaging said threaded end.

7. A trailer apparatus for use with a bicycle to transport a sailboard including a hull and a mast having a coupling provided at the base of the mast; wherein, the trailer apparatus comprises a primary wheeled support unit having an upper portion provided with means for releasably securing the primary support unit to said mast; wherein, said primary wheeled support unit comprises: a first and second framework member pivotally secured to a first cross-piece element which is operatively attached to a wheel assembly a coupling unit including means for operatively attaching the base of said mast to said bicycle; and, a secondary support unit provided with means for releasably securing the secondary support unit to said mast; wherein, both said primary and secondary support units are provided with means for supporting said hull at spaced locations.

8. The trailer apparatus as in claim 2; wherein, said secondary support unit comprises:

a third framework member provided with a second cross-piece element.

9. The trailer apparatus as in claim 8; wherein said means for supporting said hull at spaced locations comprises the first and second cross-piece elements.

10. The trailer apparatus as in claim 7; wherein, said bicycle is provided with a bicycle seat post, and said means for operatively attaching the base of the mast to said bicycle comprises a collar member having an enlarged aperture dimensioned to receive said bicycle seat post.

11. The trailer apparatus as in claim 8; wherein, said collar member is provided with means for operatively engaging the base of said mast.

12. The trailer apparatus as in claim 8; wherein, said coupling on the base of the mast is provided with a threaded end; and, said collar member is provided with threaded means for engaging said threaded end.

13. The trailer apparatus as in claim 7; wherein, said secondary support unit comprises:

a third framework member provided with a second cross-piece element.

14. The trailer apparatus as in claim 13; wherein said means for supporting said hull at spaced locations comprises the first and second cross-piece elements.

15. The trailer apparatus as in claim 7; wherein said means for releasably securing said primary and secondary support units to said mast comprise a plurality of tether members.

16. The trailer apparatus as in claim 7; wherein, said primary and secondary support units are provided with means for releasably securing said hull to the means for supporting the hull at spaced location.

17. The trailer apparatus as in claim 16; wherein said means for releasably securing said hull comprises a plurality of tether members.

* * * * *